United States Patent
Zhu et al.

(10) Patent No.: US 10,860,868 B2
(45) Date of Patent: Dec. 8, 2020

(54) LANE POST-PROCESSING IN AN AUTONOMOUS DRIVING VEHICLE

(71) Applicant: Baidu USA LLC, Sunnyvale, CA (US)

(72) Inventors: Jun Zhu, Sunnyvale, CA (US); Tae Eun Choe, Sunnyvale, CA (US); Guang Chen, Sunnyvale, CA (US); Weide Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 261 days.

(21) Appl. No.: 15/956,431

(22) Filed: Apr. 18, 2018

(65) Prior Publication Data

US 2019/0325234 A1 Oct. 24, 2019

(51) Int. Cl.
| | | |
|---|---|---|
| G06K 9/00 | (2006.01) | |
| G05D 1/00 | (2006.01) | |
| G06T 7/13 | (2017.01) | |
| B60R 11/04 | (2006.01) | |

(52) U.S. Cl.
CPC .......... G06K 9/00798 (2013.01); B60R 11/04 (2013.01); G05D 1/0088 (2013.01); G06T 7/13 (2017.01); B60R 2300/804 (2013.01); G05D 2201/0213 (2013.01); G06T 2207/30256 (2013.01)

(58) Field of Classification Search
None
See application file for complete search history.

(56) References Cited

U.S. PATENT DOCUMENTS

| | | |
|---|---|---|
| 10,011,582 B2 | 7/2018 | Foley et al. |
| 2010/0121561 A1* | 5/2010 | Kodaira ............... G01C 11/02 701/532 |
| 2016/0180177 A1* | 6/2016 | Nguyen ............ G06K 9/00798 382/104 |

FOREIGN PATENT DOCUMENTS

| | | |
|---|---|---|
| JP | 2003178399 | 6/2003 |
| JP | 2005100000 | 4/2005 |
| JP | 2008028478 | 2/2008 |
| JP | 2009237706 | 10/2009 |

* cited by examiner

*Primary Examiner* — Matthew C Bella
*Assistant Examiner* — Brian D Shin
(74) *Attorney, Agent, or Firm* — Womble Bond Dickinson (US) LLP

(57) ABSTRACT

In one embodiment, a lane processing method and system identifies traffic lanes based on images. The images can be converted to lane markers where the lane markers are based on inner edges of the identified lanes. The lane markers can be used for steering, navigation, controlling and driving an automated driving vehicle (ADV). The markers can be associated with each other, in graphical space, to construct lane lines. Additional information, such as spatial and semantic information can be associated with each lane to further improve ADV planning and control.

20 Claims, 13 Drawing Sheets

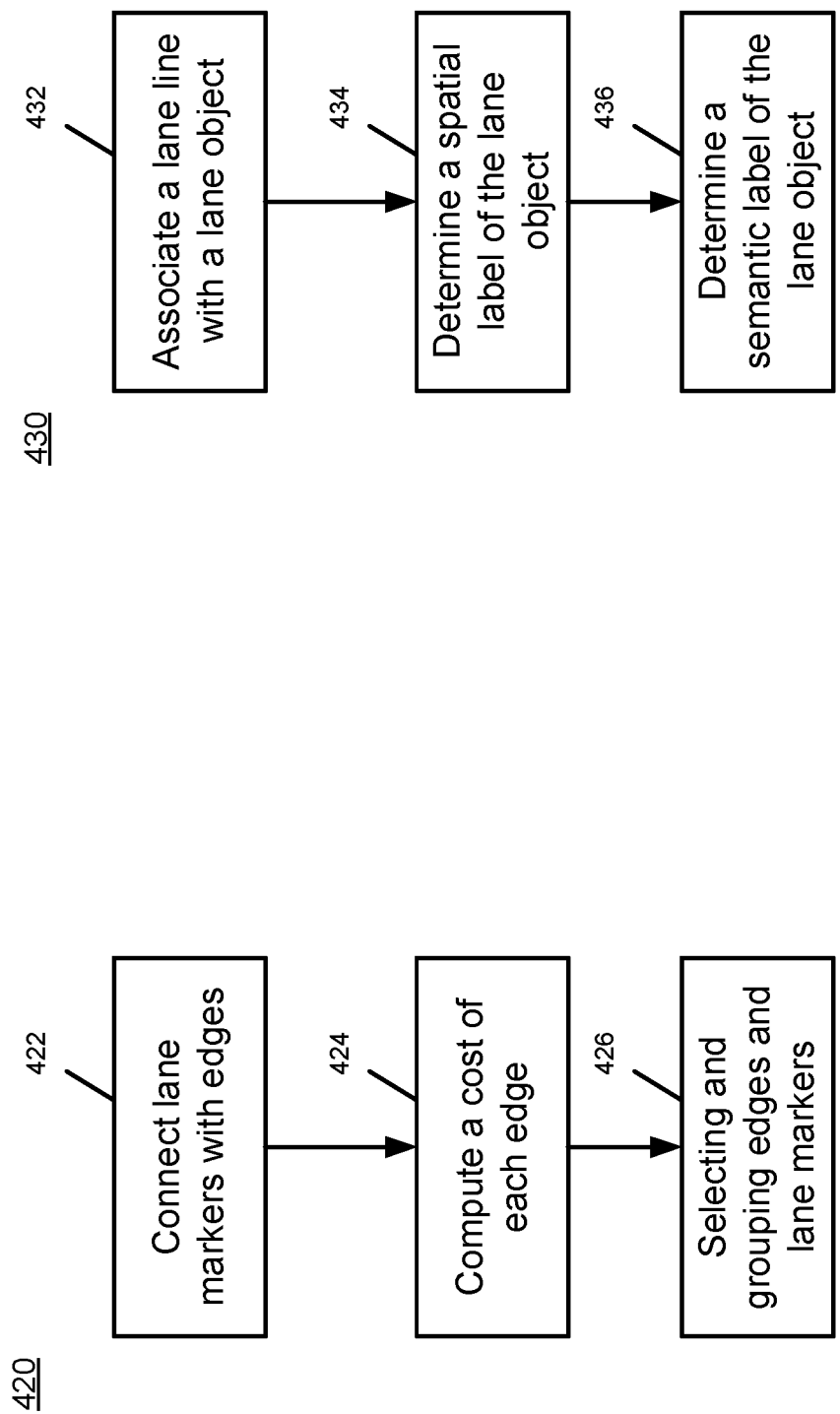

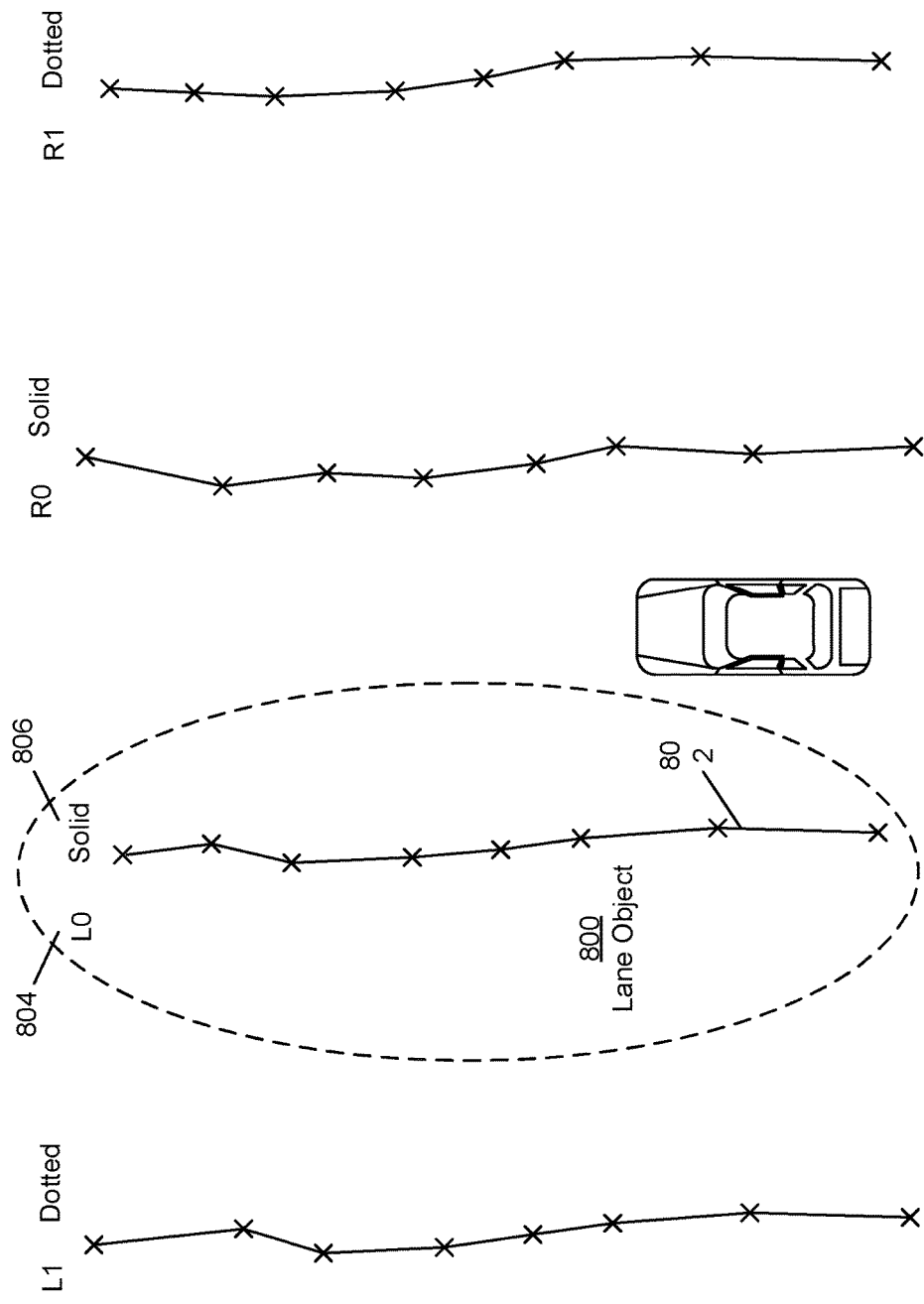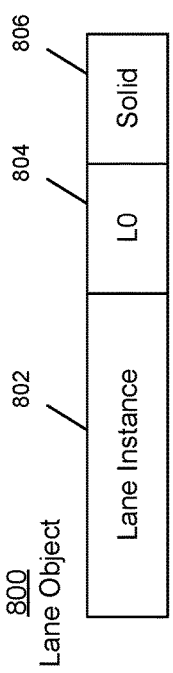
FIG. 8A
FIG. 8B

LANE POST-PROCESSING IN AN AUTONOMOUS DRIVING VEHICLE

TECHNICAL FIELD

Embodiments of the present disclosure relate generally to operating autonomous vehicles. More particularly, embodiments of the disclosure relate to processing images to recognize driving lanes and their configuration.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Autonomous driving vehicles (ADVs) can utilize different sensors and cameras including 2D cameras to determine the lane configuration of a lane including determine lane line or lane width of lanes. Lane line detection and processing is a core problem of camera-based autonomous driving solution and plays a vital role in autonomous driving. There has been a lack of efficient ways for detecting lane lines.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

FIGS. 4A-4C are flow diagrams illustrating an example of a method of post-processing a 2d image of a lane according to one embodiment.

FIG. 5A-5C shows illustrations of a lane label map image according to one embodiment.

FIGS. 8A and 8B show lane objects according to one embodiment.

DETAILED DESCRIPTION

Figure 1:
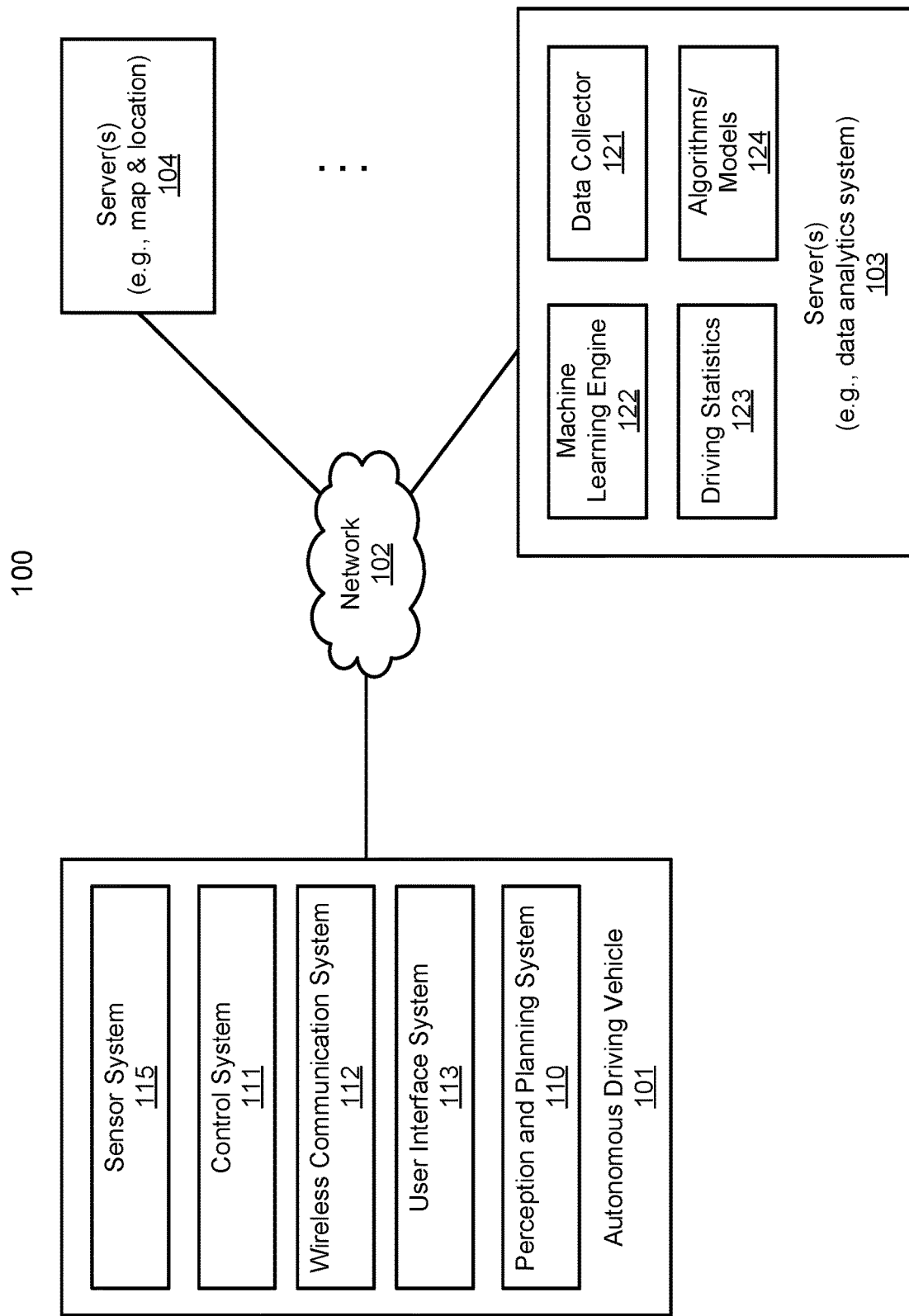
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a computer-implemented method of determining lanes for an autonomous driving vehicle is described. The method can include converting an image captured by a camera of the autonomous driving vehicle into a binary image within an image space, wherein each pixel has a first pixel value if the pixel is associated with a lane and a second pixel value if the pixel is not associated with a lane, resulting in a lane label map image; performing a connected component analysis on the lane label map image to connect adjacent pixels with an identical pixel value, resulting in connected pixels representing one or more lanes; for each of the one or more lanes, performing a contour analysis, including defining a contour of the lane, detecting, based on the contour of the lane and a position of the vehicle, an inner edge of the lane, and generating, along the inner edge, lane markers; and mapping the lane markers from the image space to a vehicle ground space. The mapped lane markers on the vehicle ground space are utilized to determine lane configuration to drive the ADV. The term "image space" as used herein refers to a digital camera image having a two-dimensional mapping of pixels (for example, with x and y coordinates).

According to some embodiments, the method further includes connecting the lane markers with edges, wherein each lane marker is connected to every other marker, resulting in a graph of edge connected markers; computing a cost of each edge, the cost being a measure of compatibility of lane markers belonging to a same lane line; and selecting and grouping edges and lane markers, resulting in lane lines formed from the selected markers and selected edges.

According to some embodiments, a system for determining lanes for an autonomous driving vehicle, having one or more computing devices, is configured to: convert an image captured by a camera of the autonomous driving vehicle (ADV) into a binary image within an image space, wherein each pixel has a first pixel value if the pixel is associated with a lane and a second pixel value if the pixel is not associated with a lane, resulting in a lane label map image; perform a connected component analysis on the lane label map image to connect adjacent pixels with an identical pixel value, resulting in connected pixels representing one or more lanes; for each of the one or more lanes, perform a contour analysis, including determine the contour of the lane, detect based on the contour of the lane and a position of the vehicle, an inner edge of the lane, and generate, along the inner edge, lane markers; and map the lane markers from the image space to a vehicle ground space, where the mapped lane markers on the vehicle ground space are utilized to determine lane configuration to drive the ADV.

Vehicle ground space, as used herein, refers to a three dimensional surface that represents the ground that the vehicle is driving on.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
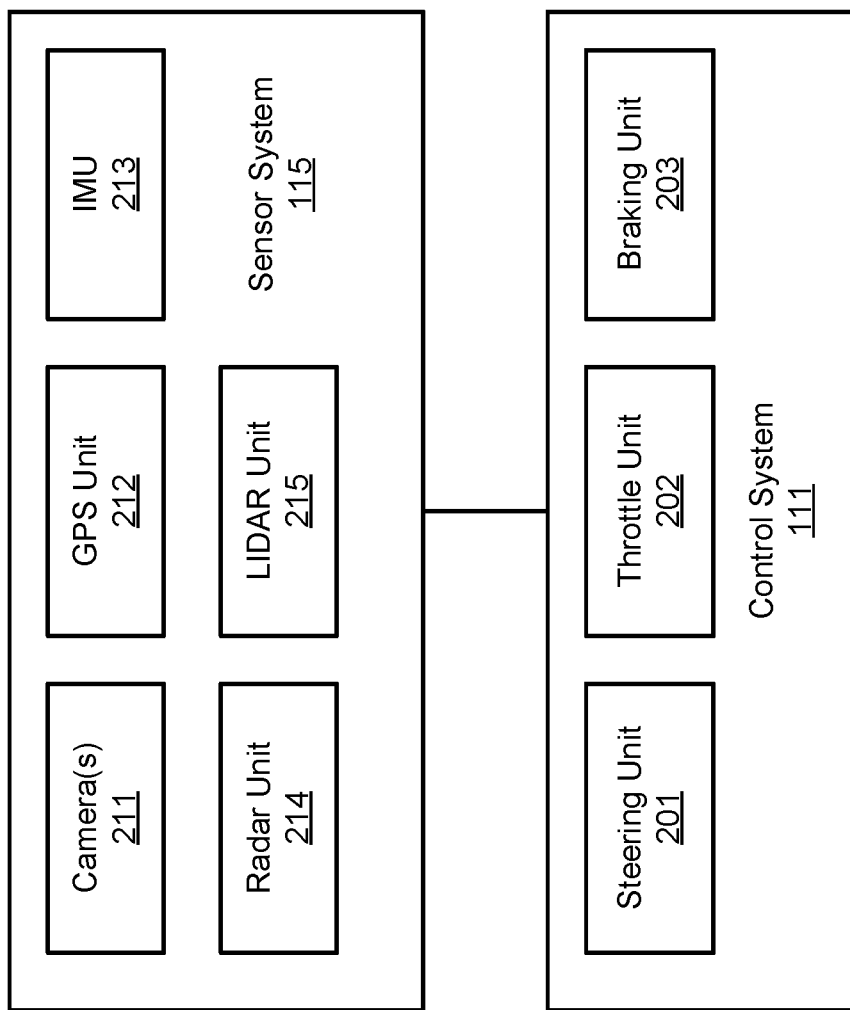
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 may include lane post processing algorithm to mark the lane or determine the lane configuration based on binary images of the lanes. Algorithms 124 may then be uploaded onto the ADVs for recognizing and determining lane configuration during real-time autonomous driving.

Figure 3A:
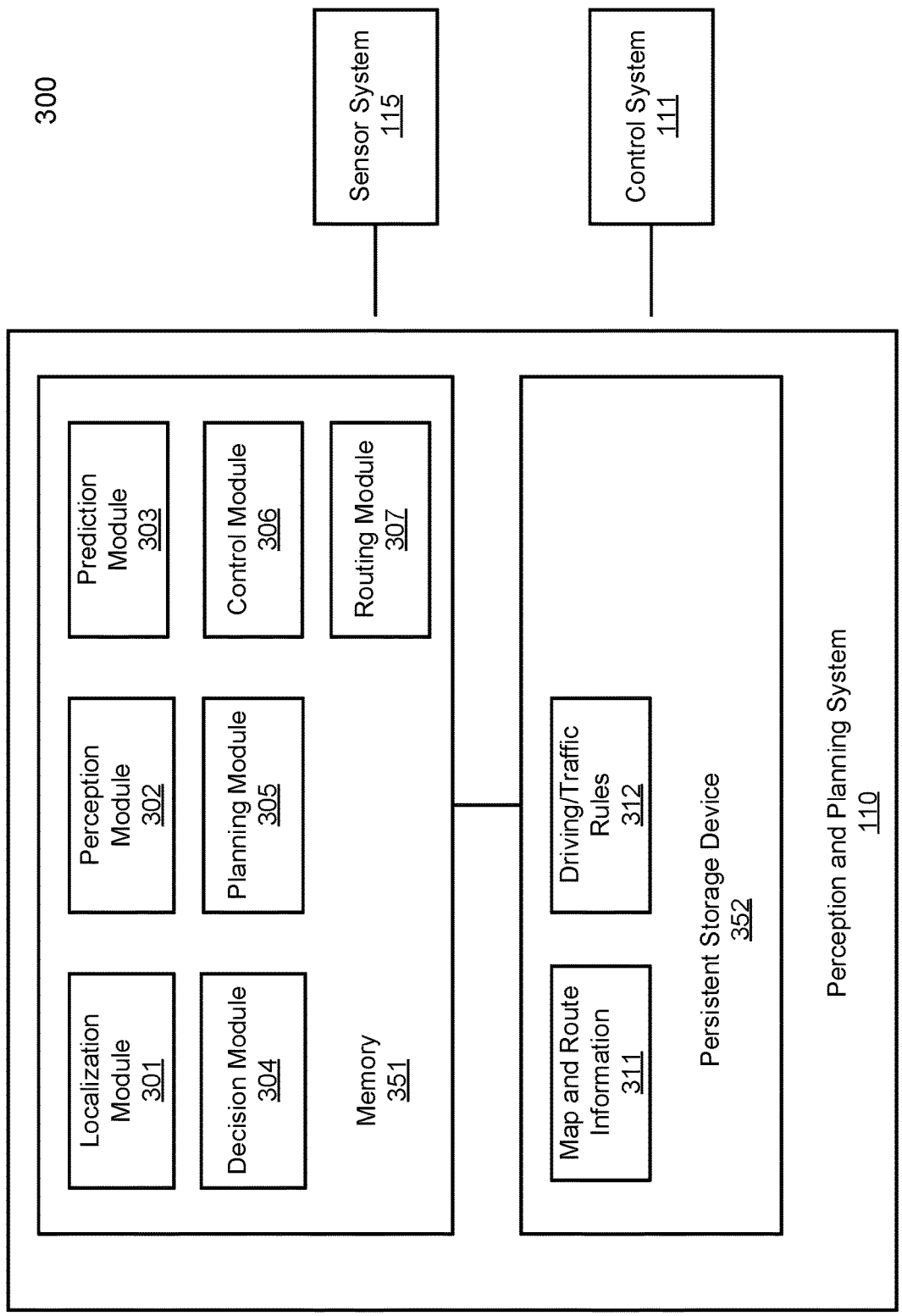
FIGS. 3A-3C are block diagrams illustrating an example of a perception and planning system used with an autonomous vehicle according to one embodiment.
Figure 3B:
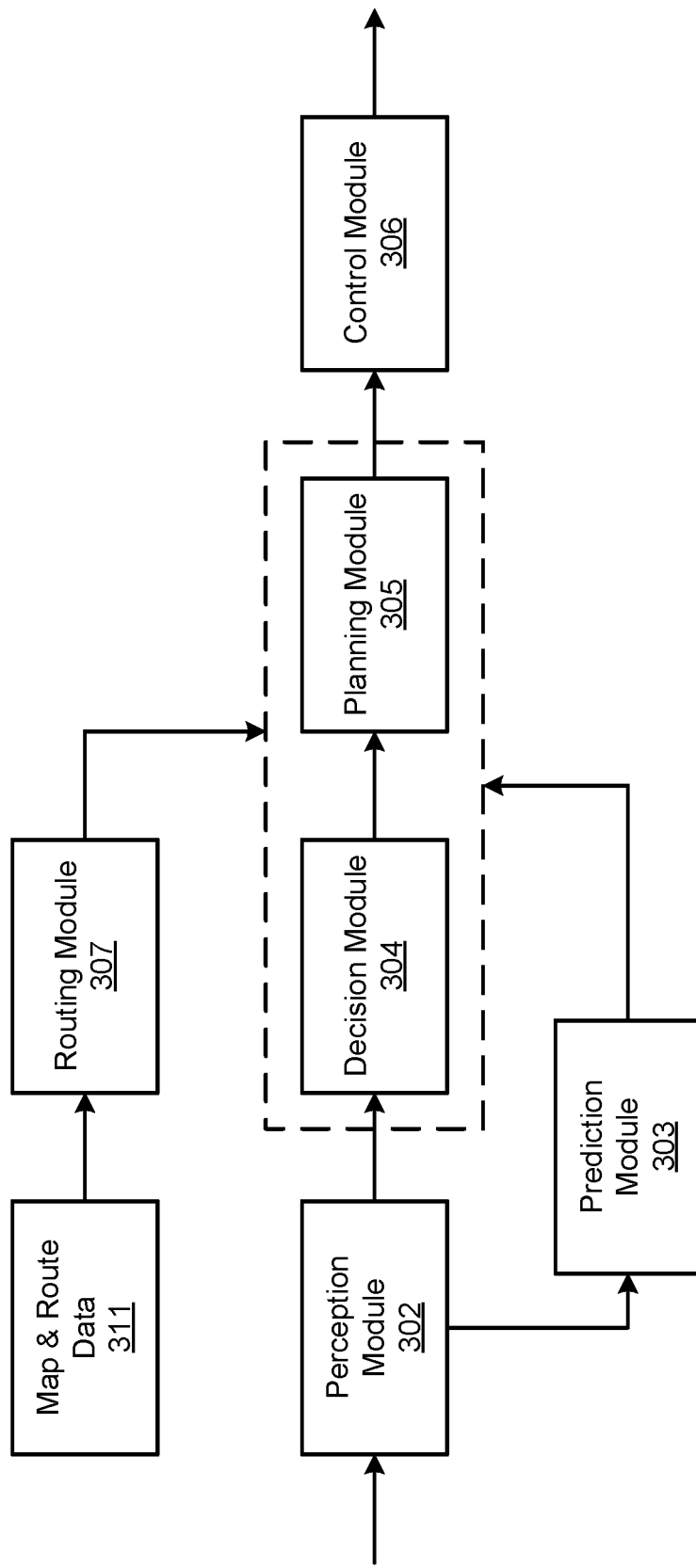

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 and their subcomponents may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, driving lanes, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR. Also see FIG. 3C for additional modules and functionality of perception module 302.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Lane line detection and processing is a core problem of camera-based autonomous vehicle driving. The ADV must have an accurate representation of traffic lanes to control, steer, and navigate the vehicle. Known methods of lane line detection and processing, however, have deficiencies, as identified herein. Thus, an improved method of lane line detection is described herein.

Figure 3C:
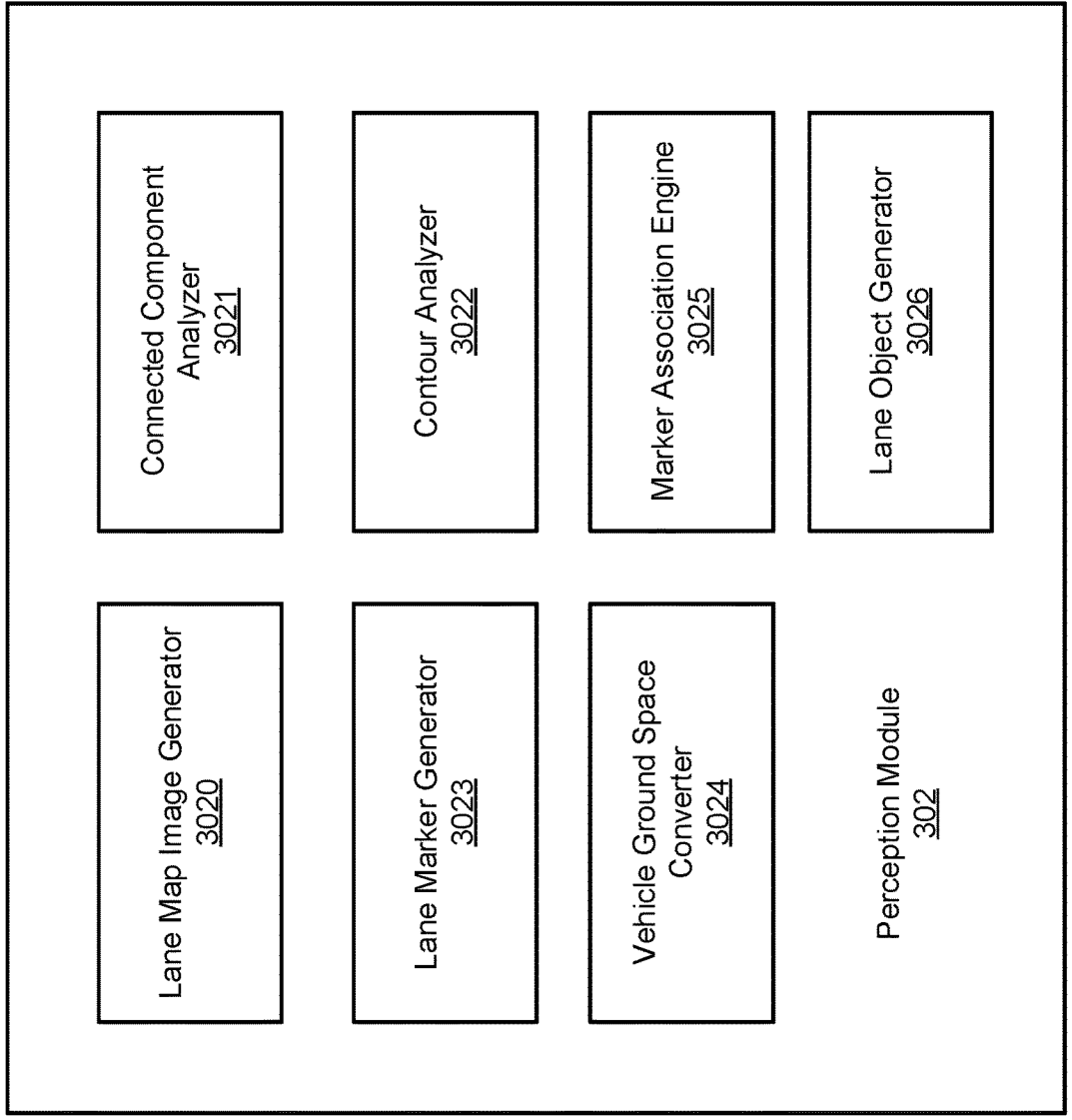

FIG. 3C illustrates an embodiment of a perception module 302 and various subcomponents. FIG. 3C is not meant to be an exhaustive illustration of the modules and functionality of perception module 302, rather, other modules and functionality are not shown. Referring to FIG. 3C, a lane map image generator 3020 can be configured to convert an image captured by a camera of an ADV into a binary image within an image space, wherein each pixel of the binary image has a first pixel value, for example, a first logical value such as '1' if the pixel is associated with a lane and a second logical value such as '0' if the pixel is not associated with a lane, resulting in a lane label map image.

A connected component analyzer 3021 can be configured to connect or group pixels from a lane label map image to identify lanes. For example, the connected component analyzer can connect adjacent pixels having a 1 or an identical pixel value. The connected/grouped pixels identify or represent one or more lanes. The connected component analyzer can connect/group the pixels, for example, by performing a merge-find or union-find on the lane pixels (pixels identified as belonging to a line).

A contour analyzer 3022 can be configured to determine the contour of a lane based on the connected pixels. A lane marker generator 3023 can be configured to determine inner edges of the contours and generate lane markers along the inner edges of the lanes. Advantageously, vehicle control based on the inner edges of the lanes provides a tighter control of the ADV and reduces the risk that the vehicle strays outside of the lane.

A vehicle ground space converter 3024 can be configured to map the lane markers from image space to a vehicle ground space. For example, the vehicle ground space converter 3024 can perform a homographic transform on the image space to map the lane markers to vehicle ground space.

Figure 7:
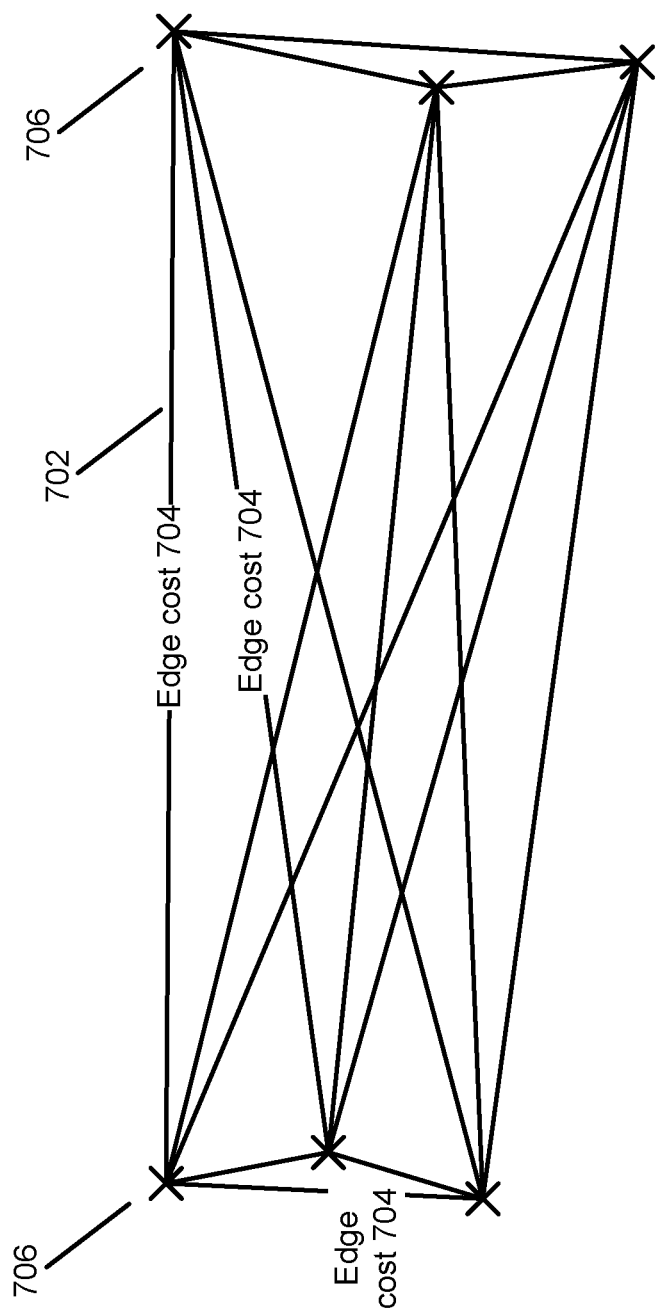
FIG. 7 shows an illustration of a graph of edge connected markers according to one embodiment.

Referring now to FIG. 7, a marker association engine 3025 can be configured to connect lane markers 602 with other lane marker through edges 702, compute a cost 704 of each edge, and select and group edges and lane markers, resulting in lanes formed from selected markers.

Referring back to FIG. 3C, a lane object generator 3026 can be configured to associate lanes formed from markers with a lane object, determine a spatial label of the lane object, and a semantic label of the lane object, described in further detail below.

Figure 4A:
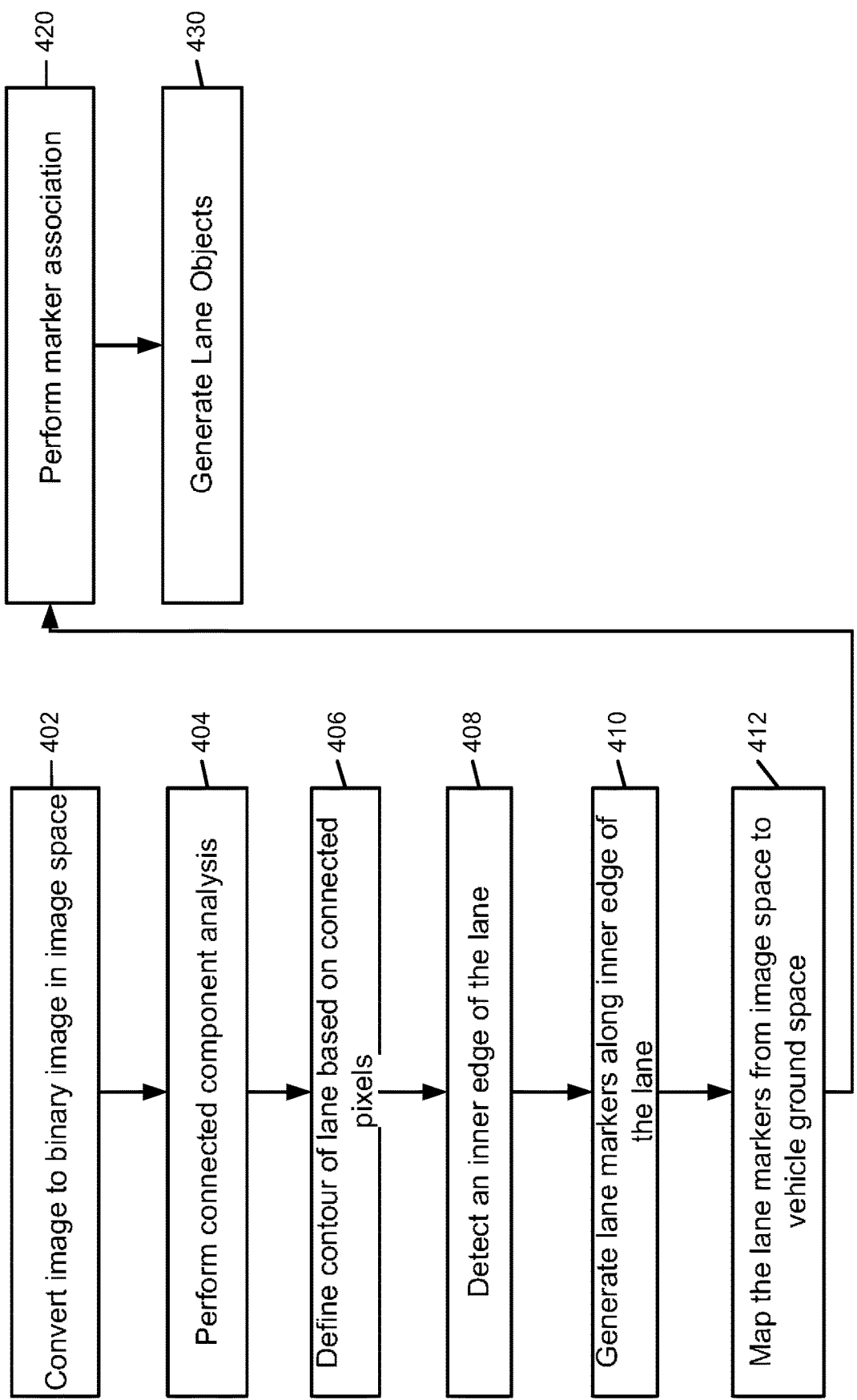

FIG. 4A shows a flow diagram illustrating a process of determining lanes for an autonomous driving vehicle according to one embodiment. The process as shown in FIG. 4A can be performed by processing logic which may include software, hardware, or a combination thereof. Once the system captures a 2D image with a camera, the system can convert the image to a binary image in image space in operation 402. Each pixel of the image can have a first logical value, if the pixel is associated with a lane, or a second logical value, if the pixel is not associated a lane (see e.g., FIG. 5C, pixels 504). Such an image can be described as a lane label map image, as shown in FIG. 5B, where the pixels 502, shown in black, illustrate pixels that are associated to driving lanes, while the white space illustrates pixels that are not associated to driving lanes. Advantageously, representing the lanes as binary pixels in image space provides a file that is faster for a processor to analyze, because the lane information is compressed (e.g., other image data is stripped from the file).

Figure 5A:
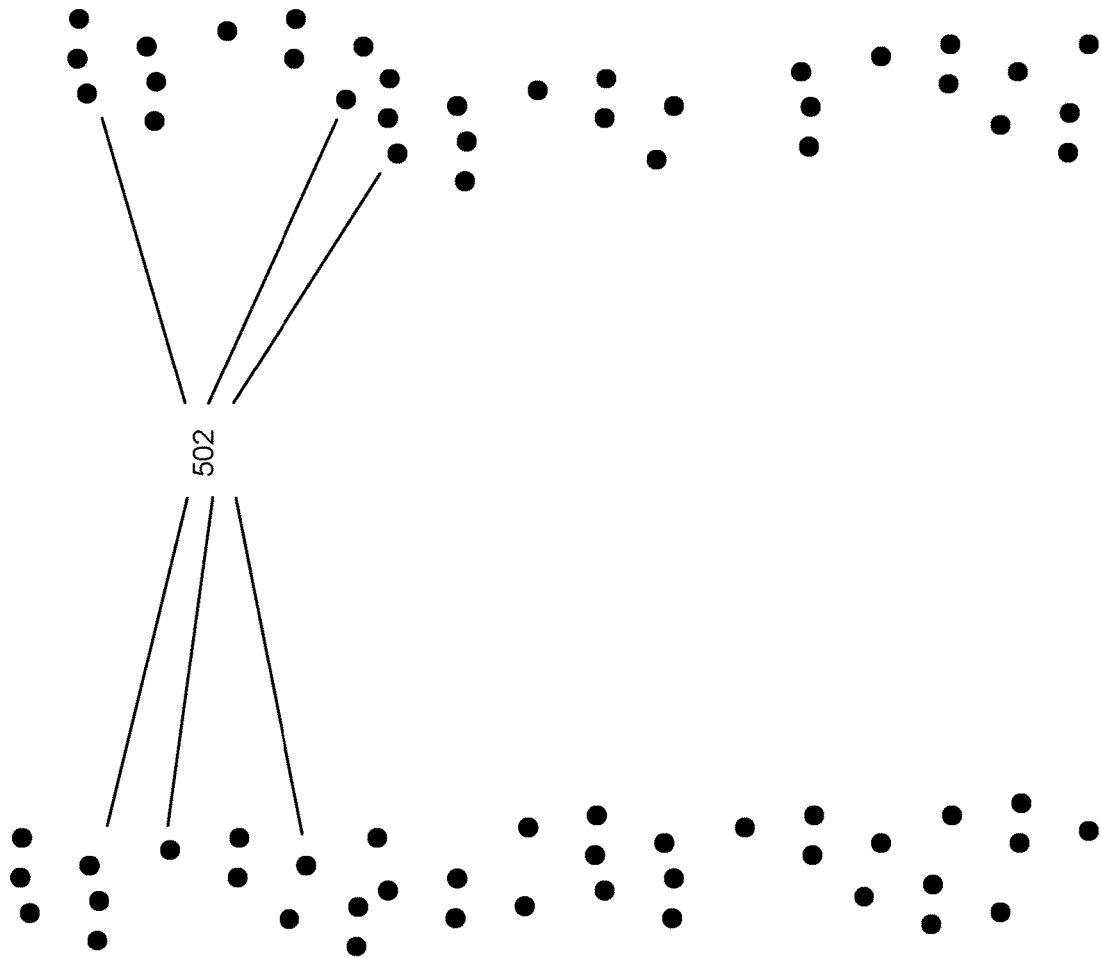
Figure 5A:
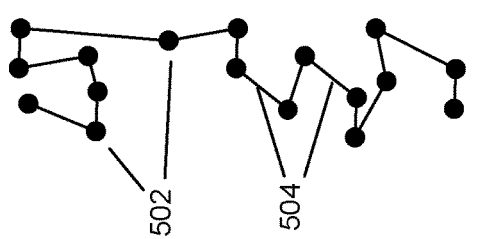
Figure 5C:
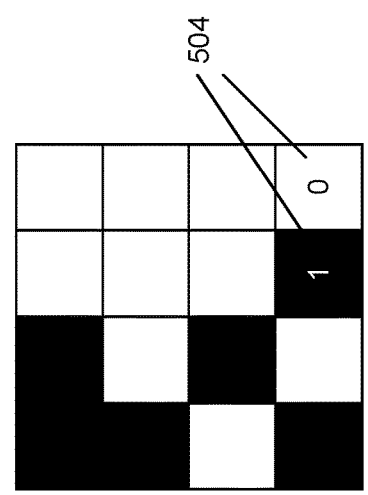

The system can then perform connected component analysis in operation 404 on the lane label map image to connect or group all the pixels that are associated with a lane, for example, by connecting or grouping adjacent lane pixels, as shown in FIG. 5A. This results in connected or grouped pixels that represent one or more lanes. Pixels can be connected and grouped by using known a union-find algorithm, or other equivalent algorithms known in the art.

Figure 6:
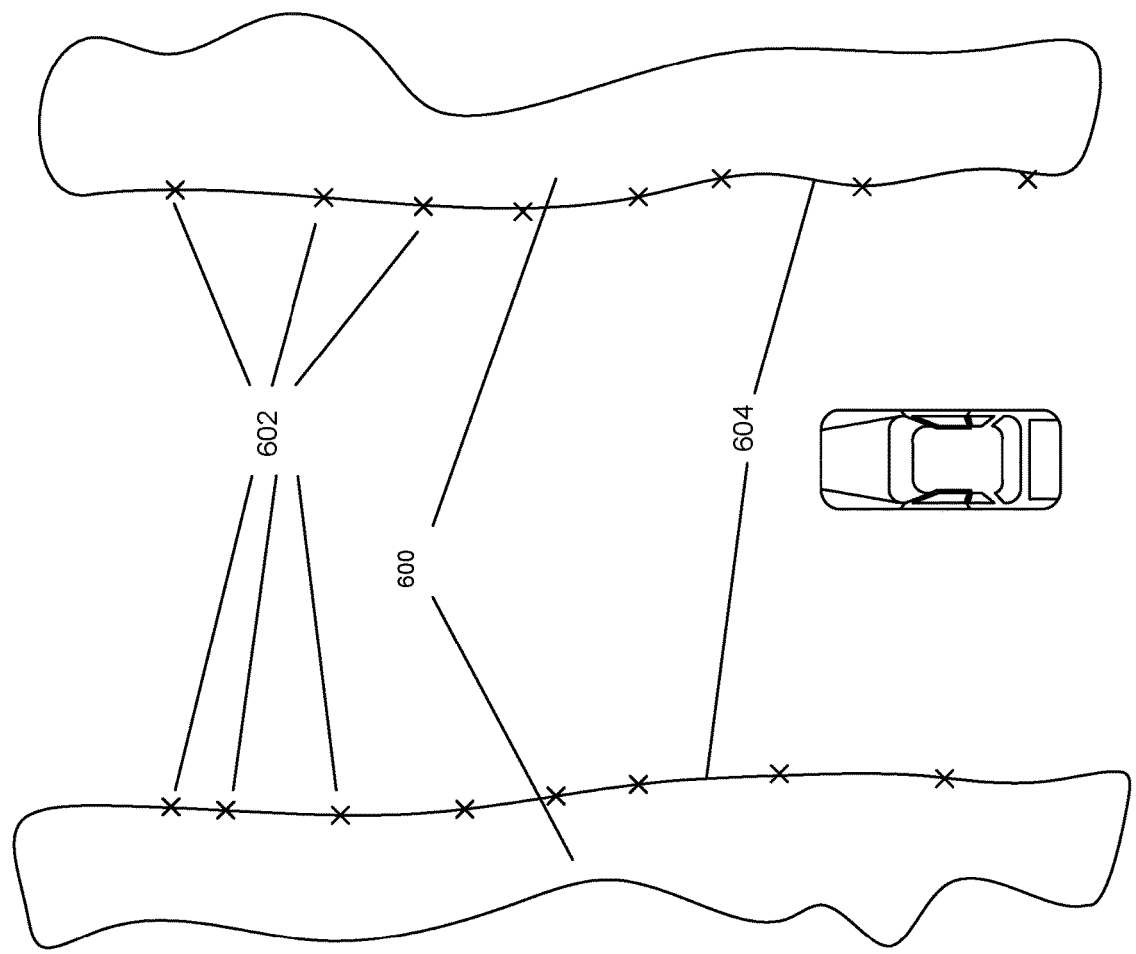
FIG. 6 shows an illustration of contour analysis and lane markers according to one embodiment.

For each of the lanes, the system can perform contour analysis. For example, the system can determine the contour of a lane 600 based on the previously connected pixels 406, as shown in FIG. 6.

Next, the system can detect an inner edge of the lane in operation 408. For example, if the ADV location is known to be between two lanes, then the system can identify the inner edges of the two lanes as the edges that are on a nearside with respect to the vehicle (i.e., interior). See FIG. 6, where the inner edges 604 are detected from the lane contours 600. Advantageously, by detecting an inner edge of the lane contours, the vehicle control can be improved because the ADV position can be localized to between the detected traffic lanes, rather than on top of the lanes.

Next, the system can generate lane markers along the inner edges of the lane in operation 410. At this point, the lane markers are still in image space. As shown in FIG. 6, lane markers 602 are markers along the detected inner edges 604 of the lane contours 600.

The system can then map the lane markers from image space to vehicle ground space in operation 412 and utilize the mapped lane markers on the vehicle ground space to determine lane configuration for steering, navigating, and driving the ADV. For example, the system can perform a homographic transform on the lane markers in image space to map them to vehicle ground space. Mapping from image space to vehicle ground space can be processor intense; however, by utilizing markers, as opposed to an entire image, valuable processor resources are saved.

When the lane markers are in vehicle ground space, the system can perform marker association in operation 420 on the lane markers. For example, as shown in FIG. 4B, the system can connect lane markers with edges in operation 422. Each marker can be connected to every other marker by an edge. Next, a cost can be computed for each edge in operation 424, where the cost is a measure of compatibility of lane markers belonging to a same lane line. For example, the system can assign a cost based on the distance between the connected nodes (e.g., a length of the edge). The system can then select and group the edge connected lane markers in operation 462, resulting in lane lines formed from the selected markers and selected edges. The selection can be based on the edge cost which can depend on the Euclidean distance, deviation angle, and/or relative orientation or combinations thereof, between the edge's two nodes/markers in vehicle ground space. The Euclidean distance can be the distance between two points in Euclidean space, the deviation angle can be the angle from which the selected edge deviates in comparison with the previous selected edge, and relative orientation can be the position and/or direction of the selected edge relative to the previous selected edge.

For example, FIG. 7 shows the lane markers 706 in vehicle ground space, connected by edges 702. Each of the markers has an edge to every other marker. An edge cost 704 is calculated for each edge. In this manner, a cost is advantageously determined between every marker pair combination, which helps in the selection and grouping of the edges and markers.

The edges can be selected, for example, by a greedy algorithm. Although generally known to be sub-optimal in finding an overall/combined shortest distance, the greedy algorithm can be advantageous in this case because of speed, simplicity, localized optimization, and because the overall/combined shortest distance between lane markers is not particularly valuable when associating lane markers. To sever clusters of markers, the system can set a threshold and base the edge selection on whether the cost meets or exceeds the threshold. If the edge selection exceeds a certain cost, the edge is not selected, thereby severing one continuously connected cluster from another.

The system can convert the lane lines into polynomial function representations of the lane lines. In this case, the lane lines are represented in graph form. Beneficially, the lane lines constructed in this manner are more reliable than other methods because the lane lines are graph-based. In contrast, other methods, such as the Hough Transform, utilize voting procedures. Hough Transform-based lane detection, however, can be unreliable because such detection methods rely on relative orientation and deviation and are carried out in parameter space. Additionally, graph-based lane lines can better detect when a lane is a dashed line or dotted line, as opposed to a solid line.

After the lane lines are formed, referring back to FIG. 4A, the system can generate lane objects in operation 430 based on the lane lines formed from the selected markers and selected edges. For example, the system can associate a lane line with a lane object in operation 432. The system can determine a spatial label of the lane object in operation 434, and determine a semantic label of the lane object in operation 436.

Spatial labels can include a taxonomy of names that identify the lane position relative to a vehicle. For example, referring now to FIGS. 8A-8B, for lane instance 802, the spatial label 804 can be "L0" to indicate that the lane is the first lane to the left of the vehicle, while a lane object with an "L1" spatial label can indicate that the lane is the second lane left of the vehicle and an "R1" can indicate that the lane is the second lane right of the vehicle. Field 806 can also be utilized indicate whether the lane instance has a solid lane line vs dash line.

The system can also determine a semantic label of the lane object. For example, based on the lane markings of the lane line associated with the lane object, the system can determine a type of lane, for example, dotted, dashed, solid, turning, double solid, double dashed, etc. Therefore, the semantic label can associate the lane object and the associated lane markers with a type of lane.

Advantageously, the spatial label, in connection with each lane object, can improve vehicle control, especially in the case where several lane instances are detected. Similarly, the semantic label can improve vehicle control by providing the planning and control system with more information about the lane type, so that the ADV can consider the lane type while making driving decisions.

Figure 9:
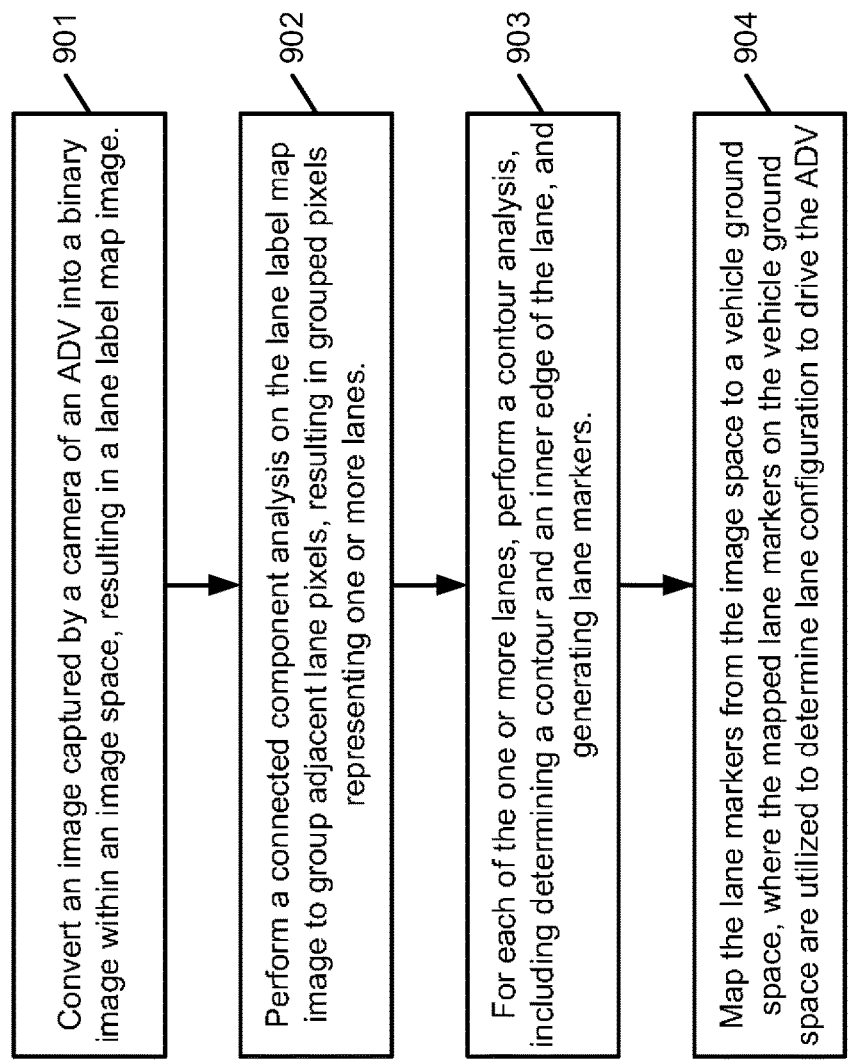
FIG. 9 is a flow diagram illustrating a process of determining lane lines of a lane for autonomous driving according to one embodiment.

FIG. 9 is a flow diagram illustrating a process of determining lane lines of a lane for autonomous driving according to one embodiment. Process 900 may be performed by processing logic which may include software, hardware, or a combination thereof. For example, process 900 may be performed by perception module 302. Referring to FIG. 9, in operation 901, processing logic converts an image captured by a camera of an ADV into a binary image within an image space, generating a lane label map image. During the conversion, an image filtering operation may be performed to modify pixel values of certain pixels that are not related to a lane or lanes. Each pixel in the binary image may have a first logical value (e.g., logical value 1 or TRUE) if the pixel is associated with a lane, or a second logical value (e.g., logical value 0 or FALSE) if the pixel is not associated with a lane. In operation 902, processing logic performs a connected component analysis on the lane label map image to group adjacent lane pixels to generate a grouped pixels representing one or more lanes. In operation 903, for each of the lanes, processing logic performs a contour analysis determine a shape of the lane, including determining a contour and an inner edge of the lane, generating lane markers. In operation 904, processing logic maps the lane markers from the image space to a vehicle ground space. The mapped lane markers of the vehicle ground space may be utilized to determine lane configuration of the lane to drive the ADV along the lane.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
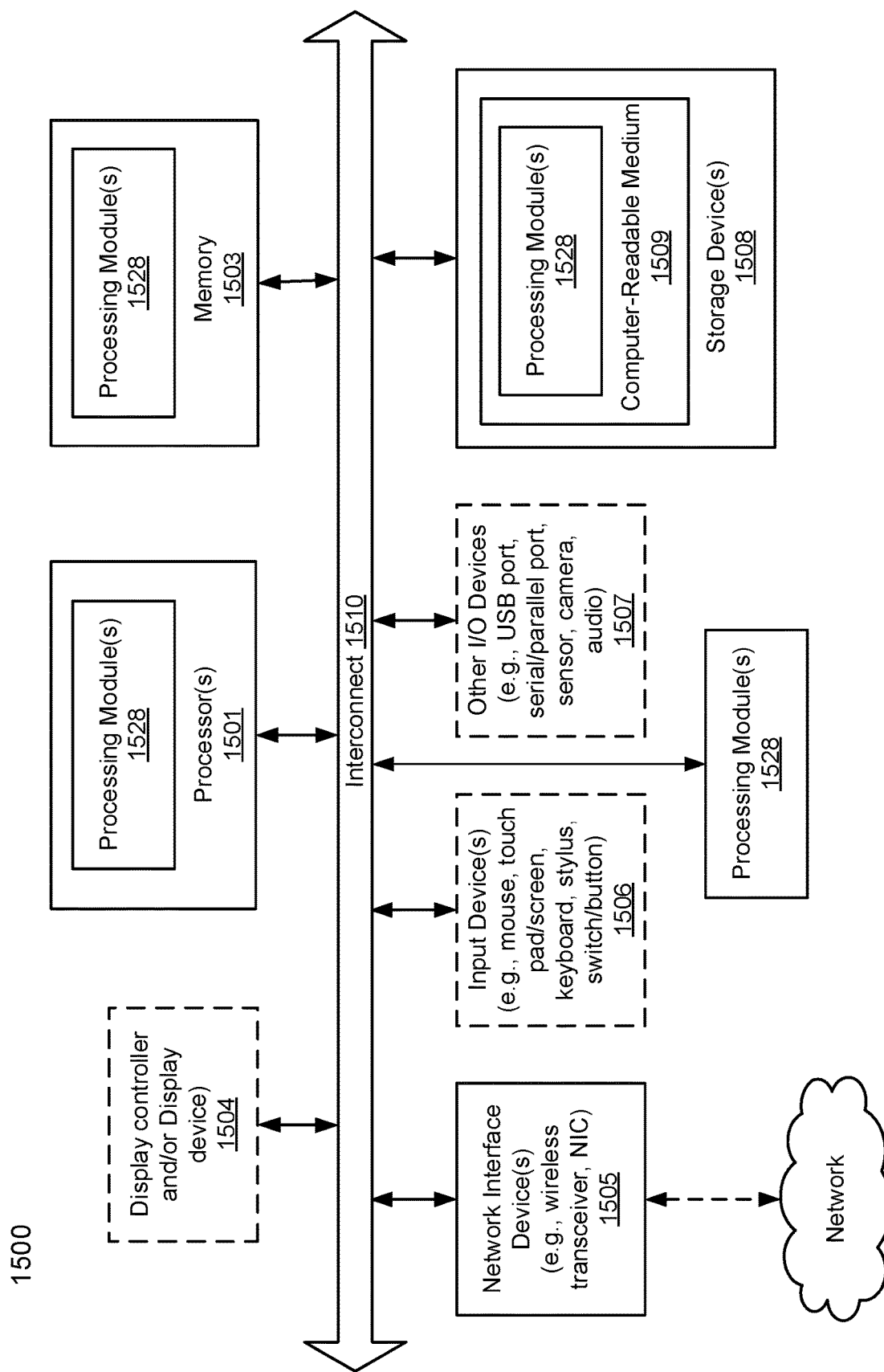
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, perception module 302 and subcomponents relating to lane-processing, for example, lane map image generator 3020, connected component analyzer 3021, contour analyzer 3022, lane marker generator 3023, vehicle ground space converter 3024, marker association engine 3025 and lane object generator 3026. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of determining lanes for an autonomous driving vehicle, the method comprising:
    converting an image captured by a camera of the autonomous driving vehicle (ADV) into a binary image within an image space, wherein each pixel has a first pixel value if the pixel is associated with a lane and a second pixel value if the pixel is not associated with a lane, resulting in a lane label map image;
    performing a connected component analysis on the lane label map image to group adjacent lane pixels, resulting in grouped pixels representing one or more lanes;
    for each of the one or more lanes, performing a contour analysis, including
        determining a contour of a lane,
        detecting an inner edge of the lane, and
        generating, along the inner edge, lane markers connected by edges, resulting in a graph of edge connected markers,
        computing a cost of each edge, the cost being a measure of compatibility of lane markers belonging to a same lane line; and
    mapping the lane markers from the image space to a vehicle ground space, wherein the mapped lane markers on the vehicle ground space are utilized to determine lane configuration to drive the ADV.

2. The method according to claim 1, further comprising: selecting and grouping edges and lane markers based on the costs of edges, resulting in lane lines formed from the selected markers and selected edges.

3. The method according to claim 2, further comprising: associating one or more lane lines with a corresponding lane object.

4. The method according to claim 2, further comprising: associating one or more lane lines with a corresponding lane object based on a lane instance quality of each lane object.

5. The method according to claim 3, further comprising: determining a spatial label of the lane object, based on a position of the lane object with respect to a position of the vehicle.

6. The method according to claim 3, further comprising: determining a semantic label of the lane object, based on the lane markers of the lane line associated with the lane object, wherein the semantic label includes a dotted lane and a dashed lane.

7. The method according to claim 2, wherein the selecting and grouping of the edges are performed by a greedy algorithm.

8. The method according to claim 2, wherein the cost of each edge is assigned based on a distance between connected nodes.

9. The method according to claim 2, wherein the lane line markers are stored in graphical space, forming a polynomial function.

10. A non-transitory machine-readable medium having instructions stored therein, which when executed by a processor, cause the processor to perform operations, the operations comprising:
    converting an image captured by a camera of the autonomous driving vehicle (ADV) into a binary image within an image space, wherein each pixel has a first pixel value if the pixel is associated with a lane and a second pixel value if the pixel is not associated with a lane, resulting in a lane label map image;

performing a connected component analysis on the lane label map image to group adjacent lane pixels, resulting in grouped pixels representing one or more lanes;

for each of the one or more lanes, performing a contour analysis, including determine a contour of the lane, detecting an inner edge of the lane, and generating, along the inner edge, lane markers connected by edges, resulting in a graph of edge connected markers, computing a cost of each edge, the cost being a measure of compatibility of lane markers belonging to a same lane line; and mapping the lane markers from the image space to a vehicle ground space, wherein the mapped lane markers on the vehicle ground space are utilized to determine lane configuration to drive the ADV.

11. The non-transitory machine-readable medium according to claim 10, the operations further comprising:

selecting and grouping edges and lane markers based on the costs of edges, resulting in lane lines formed from the selected markers and selected edges.

12. The non-transitory machine-readable medium according to claim 11, the operations further comprising:

associating one or more lane lines with a corresponding lane object.

13. The non-transitory machine-readable medium according to claim 11, the operations further comprising:

associating one or more lane lines with a corresponding lane object based on a lane instance quality of each lane object.

14. The non-transitory machine-readable medium according to claim 12, the operations further comprising:

determining a spatial label of the lane object, based on a position of the lane object with respect to a position of the vehicle.

15. The non-transitory machine-readable medium according to claim 12, the operations further comprising:

determining a semantic label of the lane object, based on the lane markers of the lane line associated with the lane object, wherein the semantic label includes a dotted lane and a dashed lane.

16. The non-transitory machine-readable medium according to claim 11, wherein the selecting and grouping of the edges are performed by a greedy algorithm.

17. The non-transitory machine-readable medium according to claim 11, wherein the cost of each edge is assigned based on a distance between connected nodes.

18. The non-transitory machine-readable medium according to claim 11, wherein the lane line markers are stored in graphical space, forming a polynomial function.

19. A data processing system, comprising:

a processor; and a memory coupled to the processor to store instructions, which when executed by the processor, cause the processor to perform operations, the operations including converting an image captured by a camera of the autonomous driving vehicle (ADV) into a binary image within an image space, wherein each pixel has a first pixel value if the pixel is associated with a lane and a second pixel value if the pixel is not associated with a lane, resulting in a lane label map image;

performing a connected component analysis on the lane label map image to group adjacent lane pixels, resulting in grouped pixels representing one or more lanes;

for each of the one or more lanes, performing a contour analysis, including determining a contour of the lane, detecting an inner edge of the lane, and generating, along the inner edge, lane markers connected by edges, resulting in a graph of edge connected markers, computing a cost of each edge, the cost being a measure of compatibility of lane markers belonging to a same lane line;

mapping the lane markers from the image space to a vehicle ground space, wherein the mapped lane markers on the vehicle ground space are utilized to determine lane configuration to drive the ADV.

20. The system of claim 19, wherein the operations further comprise:

selecting and grouping edges and lane markers based on the costs of edges, resulting in lane lines formed from the selected markers and selected edges.

* * * * *